A. Stewart,
Horse Power.
Nº 65,297. Patented May 28, 1867.
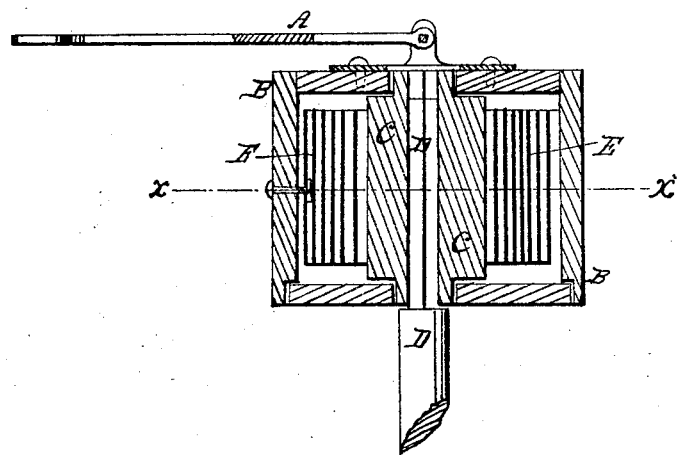
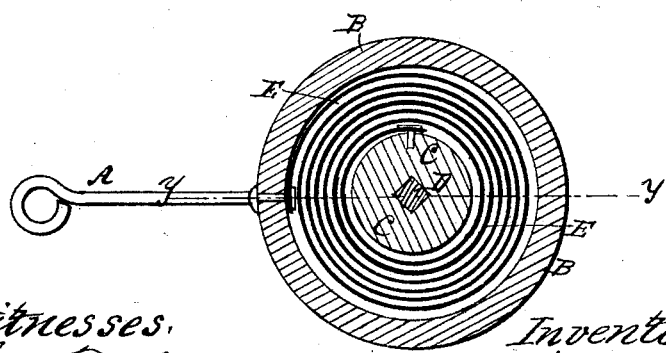
Witnesses:
Theo Fusche
J. A. Servici
Inventor:
Archibald Stewart
Per
Attorney

United States Patent Office.

ARCHIBALD STEWART, OF TROY, WISCONSIN.

Letters Patent No. 65,297, dated May 28, 1867.

IMPROVEMENT IN DRAUGHT-EQUALIZER FOR HORSE-POWERS.

The Schedule referred to in these Letters Patent and making part of the same.

TO ALL WHOM IT MAY CONCERN:

Be it known that I, ARCHIBALD STEWARD, of Troy, in the county of Walworth, and State of Wisconsin, have invented a new and useful Improvement in Draught-Equalizer for Horse-Powers; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved equalizer taken through the line $y\ y$, fig. 2.

Figure 2 is a horizontal section of the same taken through the line $x\ x$, fig. 1.

Similar letters of reference indicate like parts.

My invention has for its object to prevent breakage in the machinery of threshing and other machines driven by horse-power, from the strain caused by the sudden starting or jerking of the horses, and it consists in the combination of the tumbling-rod, outer cylinder, coiled spring, inner cylinder or roller, and rod, with each other, as hereinafter more fully described.

A represents the tumbling-rod, which is attached securely to the end of the cast-iron cylinder B. The cylinder B is hollow, and has a roller, C, placed in its centre, the ends of which revolve in bearings in the ends of the cylinder B. The roller or interior cylinder C is perforated longitudinally with a square hole, for the reception of the squared end of the rod B, by which the motion is transferred from the horse-power to the machinery to be driven. E is a spring coiled around the roller or cylinder C, to which one of its ends is attached, the other end being securely attached to the side of the outer cylinder B, as shown in figs. 1 and 2. The spring E must be of a size, strength, and elasticity proportioned to the power to be applied, so that the greatest power that will be applied to it shall never be able to coil the spring up closely around the roller C, but the power will always be transferred to the machinery through the medium of the elasticity of the said spring.

By this construction any strain caused by the sudden starting up or jerking of the horses will be neutralized, and all breakages of the machinery from this cause will be effectually guarded against.

I claim as new, and desire to secure by Letters Patent—

The combination of the tumbling-rod A, outer cylinder B, coiled spring E, interior cylinder or roller C, and rod D, with each other, substantially as herein shown and described and for the purpose set forth.

ARCHIBALD STEWART.

Witnesses:
A. J. CHENEY,
O. F. BRIGHT.